United States Patent [19]
Dent et al.

[11] Patent Number: 5,598,575
[45] Date of Patent: Jan. 28, 1997

[54] MULTIPROCESSOR DATA MEMORY SHARING SYSTEM IN WHICH ACCESS TO THE DATA MEMORY IS DETERMINED BY THE CONTROL PROCESSOR'S ACCESS TO THE PROGRAM MEMORY

[75] Inventors: Paul W. Dent, Stehag; Alf J. P. Larsson, Bjärred, both of Sweden

[73] Assignee: Ericsson Inc., Research Triangle Park, N.C.

[21] Appl. No.: 626,911

[22] Filed: Apr. 15, 1996

Related U.S. Application Data

[63] Continuation of Ser. No. 143,640, Nov. 1, 1993, abandoned.

[51] Int. Cl.$^6$ ................................................. G06F 13/28
[52] U.S. Cl. ................. 395/800; 395/848; 364/228.6; 364/238.4; 364/242.3; 364/DIG. 1
[58] Field of Search ................................ 395/800, 848; 364/228.6, 238.4, 242.3, DIG. 1

[56] References Cited

U.S. PATENT DOCUMENTS

| | | | |
|---|---|---|---|
| 4,564,900 | 1/1986 | Smitt | 395/325 |
| 4,912,636 | 3/1990 | Magar et al. | 395/425 |
| 4,991,112 | 2/1991 | Callemyn | 395/425 |
| 5,099,417 | 3/1992 | Magar et al. | 395/425 |
| 5,121,487 | 6/1992 | Bechtolsheim | 395/325 |
| 5,151,997 | 9/1992 | Bailey et al. | 395/800 |
| 5,163,154 | 11/1992 | Bournas et al. | 395/775 |
| 5,175,841 | 12/1992 | Magar et al. | 395/425 |
| 5,179,689 | 1/1993 | Leach et al. | 395/425 |
| 5,197,143 | 3/1993 | Lary et al. | 395/425 |
| 5,210,848 | 5/1993 | Liu | 395/425 |
| 5,214,769 | 5/1993 | Uchida et al. | 395/425 |
| 5,218,686 | 6/1993 | Thayer | 395/425 |

FOREIGN PATENT DOCUMENTS

| | | |
|---|---|---|
| 0191939A1 | 8/1986 | European Pat. Off. . |
| 0346917A3 | 12/1989 | European Pat. Off. . |
| 0557197A1 | 8/1993 | European Pat. Off. . |
| 2263047 | 7/1993 | United Kingdom . |
| WO93/23810 | 11/1993 | WIPO . |

OTHER PUBLICATIONS

"Programmable Burst Control for Load/Store Operations", IBM Technical Disclosure Bulletin, vol. 33, No. 11, Apr. 1991, p. 30.
Certified English–language translation of EP 0 557 197 A1, which was published in French on Aug. 25, 1993.

Primary Examiner—Alyssa H. Bowler
Assistant Examiner—John Harrity
Attorney, Agent, or Firm—Burns, Doane, Swecker & Mathis, L.L.P.

[57] ABSTRACT

In a system including a control processor, a coprocessor, a program memory and a data memory, the control processor accessing the program memory during an instruction fetch cycle and the data memory during an instruction execution cycle, an apparatus for controlling access to the data memory has a control processor interface for coupling to the control processor, a coprocessor interface for coupling to the coprocessor, and instruction fetch detection logic, coupled to the control processor interface, for detecting when the control processor requests access to the program memory and generating, in response, a first access control signal. The apparatus also has scheduling logic, coupled to the coprocessor interface, for detecting when the coprocessor requests access to the data memory and, in response, generating a second access control signal. A switch in the apparatus couples memory address, memory data and memory control signals to the data memory alternatively from the control processor or the coprocessor. A switch control signal for the switch is generated by arbitration logic, coupled to the instruction fetch detection logic, the scheduling logic, and the switch, for generating a switch control signal in response to the first and second access control signals. The detection of an instruction fetch by the control processor may be based on an instruction fetch signal issued by the control processor, or by the detection of an address generated by the control processor not being in a range associated with the data memory.

25 Claims, 9 Drawing Sheets

MULTIPROCESSOR DATA MEMORY SHARING SYSTEM IN WHICH ACCESS TO THE DATA MEMORY IS DETERMINED BY THE CONTROL PROCESSOR'S ACCESS TO THE PROGRAM MEMORY

This application is a continuation, of application Ser. No. 08/143,640, filed Nov. 1, 1993 now abandoned.

BACKGROUND

The present invention relates to an apparatus in a computer architecture consisting of a control processor, one or more coprocessors, and a shared data memory, and more particularly to an apparatus in such a system for permitting the control processor to continue fetching instructions from a control memory while other coprocessors are permitted access to the shared memory, and even more particularly to such an apparatus which permits the control processor to share the data memory with the coprocessors without substantially impeding the control processor's execution of a control program.

Prior art microprocessors of the type known as Von Neumann architectures have a single bus for connection to memory of all types, including Random Access Memory (RAM), Read Only Memory (ROM), Programmable Read Only Memory (PROM), Electronically Programmable Read Only Memory (EPROM) and Electronically Erasable and re-Programmable Read Only Memory (EEPROM).

ROM, PROM and EPROM are generally used for storing program instructions because these types of memory are "non-volatile." That is, they do not lose their program contents when power is switched off. This is important for battery operated equipment that can temporarily be switched off to save battery power.

RAM and EEPROM on the other hand are used for storing temporary working variables (RAM) or data that the computer may wish to change as a result of program execution, but which must be preserved through a power-down period (EEPROM).

In the Von Neumann architecture, all of the various memory modules are coupled to the same electronic address and data bus, so that the computer is only able to access either the program memory or the data memory, but not both at once. Having one bus also means that fixed data variables can be stored in program ROM, and that program instructions can be executed from data RAM if desired.

Examples of prior art Von Neumann architectures are the INTEL 8085 and the IBM PC series microprocessors 8088, 8086, 80186, 286, 386, 486; the ZILOG Z80 and the MOTOROLA 6800, 6801, 6802, 6803 . . . 6809 and 68000 series processors.

In recognition of the use of one type of memory for program instructions and another type of memory for storing dynamically changing data, another architecture known to the prior art as the Harvard architecture is often used. The Harvard architecture is characterized by having separate buses for program memory and data memory such that program instructions cannot be executed from data memory and possibly, depending on the implementation, data cannot be written to program memory.

Both architectures, Harvard and Von Neumann, generally permit constants to be read from program memory, a mode often known as direct addressing, because there would otherwise be no means for initializing an initially empty data RAM.

Harvard architectures may permit processing speed to be increased without being impeded by the well-known memory access bottleneck phenomenon, by allowing data in RAM to be manipulated at the same time as the processor is fetching its next instruction from program ROM. This overlapping process is known as pipelining. Not all Harvard architectures employ pipelining however.

Examples of Harvard architectures are digital signal processor chips such as the Texas instruments TMS320 series and ANALOG DEVICES ADSP2100 series, which do employ pipelining.

Harvard architectures can also exist in an architecture having only a single bus for addressing and transferring data between the computer and both program and data memory types. Here, the different types of transfer (i.e., the program instructions or data) are distinguished by having separate Read, Write or Control signals for the different types of memory. These architectures cannot employ pipelining. Examples of this architecture are the INTEL 8048, 8049, 8051 series microcontrollers. Of course, the speed advantage of the Harvard architecture is sacrificed in these parts for the purpose of achieving a reduction in pin count on the integrated circuit. The advantage of separate program and data memories in this case however is that a single 16-bit address bus can address not only 65,536 bytes of data, but also 65,536 bytes of program instructions. This is in sharp contrast to a Von Neumann architecture, such as the Z80 or 8085, which has a 16-bit address bus that can only address 65,536 bytes total, which have to be split between program instructions and data, for example, 56K program and 8K data, or 32 k program and 32 k data.

Another prior art technique for speeding up the processing speed of a computer system is known as Direct Memory Access (DMA). DMA is a technique that was devised to allow peripheral devices such as disc drives, magnetic tape readers, communications modems, etc. to extract data from the computer data memory for transmission or storage in peripheral media, or conversely to place directly into computer memory data retrieved from storage devices or received by a communications modem, without significantly slowing execution of the computer which uses the same memory. This is of course only useful in so-called multi-programming applications where there are other jobs that the computer can usefully be executing while a first job is awaiting completion of the DMA operation. DMA is an Input/Output (I/O) technique which serves as an alternative to executing computer instructions that input or output data bytes to or from memory. Thus the computer is not occupied by I/O operations, which are performed autonomously by DMA control circuits. The computer merely initializes a DMA controller to take or receive a determined number of bytes N from or into memory beginning at a determined location. The computer then suspends any task that cannot resume until the DMA operation is completed, and gets on with the next highest priority task. Upon completion of DMA, an interrupt is generated by the DMA controller in order to inform the computer that that DMA operation is complete. In response, the computer suspends the current task and resumes the task that originally requested the DMA. If the resumed task is now complete, the suspended task or a higher priority task may be resumed.

An alternative method of terminating a DMA or any I/O operation is by programming the DMA or I/O controller to detect a particular data pattern as the last in the transfer, such as an End Of File (EOF) or End Of Transfer (EOT) character.

While prior art DMA I/O techniques allow the computer to perform other tasks while awaiting I/O completion, these other tasks do not necessarily continue at the same speed of execution as in the absence of an active DMA operation, due to contention for access to the same memory. If the memory that the computer and the DMA controller may both be attempting to access is at least twice as fast as needed for a single access, it may be time-shared between alternate DMA and computer accesses such that neither experiences delay. On the other hand, if speed is limited by the memory access time, then prior art techniques require that one process or the other, either computation or I/O, be put on hold in order to allow the other process to proceed. This has the disadvantage that one cannot be absolutely sure exactly how long a given program will take to execute if DMA operations can steal RAM access cycles at arbitrary moments. In real time applications, such as controlling the timing of operations in a Time Division Multiple Access radio communication device, accurate timing is important to maintain.

It is therefore desirable to provide an improved DMA controller that allows peripheral device controllers or special purpose co-processors access to a general purpose microprocessor's data RAM in a non-contentious manner, thereby avoiding a disturbance of the program execution timing.

The connection of special purpose coprocessors together with general purpose microprocessors is also known to the prior art. Some modern digital signal processors adapted to perform fast fixed or floating point arithmetic comprise a so-called host port. A host port is a set of pin connections for attaching to a general purpose microprocessor which will orchestrate the activity of the signal processor. The nature of this host port connection however does not allow the coprocessor to directly access the microprocessor data memory, even if the host can conversely directly access the coprocessor memory. The latter is less contentious because coprocessors, including their internal memory speeds, are generally an order of magnitude faster than the general purpose host processor. Thus it is impossible for the general purpose host processor to significantly delay a fast coprocessor, but a coprocessor could on the other hand significantly delay operation of the host.

Such examples of DMA by coprocessors to host processors as exist in the prior art are of the known DMA type that allows access to memory by arbitrating between contending main processor and coprocessor demands, while the converse, of host access to coprocessor memory is achieved by cycle stealing. Thus, it is desirable to provide an apparatus which allows non-contentious access by one or more coprocessors to the host's Random Access Memory.

SUMMARY

It is therefore an object of the present invention to provide an improved DMA controller that allows peripheral device controllers or special purpose coprocessors to access a general purpose microprocessor's data RAM in a non-contentious manner, thereby avoiding disturbing timing.

It is another object of the present invention to provide an apparatus which permits a general purpose microprocessor to continue fetching instructions from a program memory, while simultaneously permitting peripheral device controllers or special purpose coprocessors access to the general purpose microprocessor's data RAM.

It is yet another object of the present invention to provide an apparatus having the above features and which works in conjunction with a general purpose microprocessor having a Von Neumann architecture.

The present invention operates in a system wherein a control microprocessor executes a control program stored in a Read Only Memory (ROM). The instructions of the control program often, but not always, read data from or write data to a Random Access Memory (RAM) which serves as a data memory. Thus, the data memory is not accessed by the control processor when reading instructions from ROM and even not for some proportion of the instructions during instruction execution. However, while the control processor is fetching its next instruction from the read only memory, a simultaneous data memory access by another entity would normally be impossible because microprocessors generally use the same address and data bus to connect to all memory types, whether control memory (ROM) or data memory (RAM). However, the present invention creates a separate bus for the ROM and the data memory by using a switch to isolate the data memory from the control processor at least whenever the control processor is reading an instruction from ROM. The switch may be operated by a control signal that is provided by the microprocessor, signifying that an "instruction fetch" operation is taking place. This signal and others are used by RAM bus arbitration logic to determine when the RAM bus may be allocated to other processors. Alternatively, detection means may be provided for detecting whether or not the control processor is attempting to access an address that does not correspond to an address region associated with the data memory.

Depending on the relative speed of the data memory and the ROM, the time during which the control processor performs instruction fetch may allow one or more data memory accesses to serve the needs of coprocessors. After a Direct Memory Access scheduler has served this number of data memory accesses, it ceases to access the data memory in time for the control processor to assert, if needed, the switch control signal that reconnects the RAM bus to the control processor. The control processor program execution is thus not slowed at all by such accesses by other processors.

In accordance with another feature of the present invention, an exception allows high priority requests for the RAM bus to take precedence over the control processor. High priority may be asserted for example when a queue for data memory accesses maintained by a DMA scheduler has reached a maximum permitted queue length, at which point the scheduler is granted prolonged use of the data memory until it has emptied the queue in question and the control processor is issued a WAIT signal should it attempt to access data memory in the meantime.

Thus, in accordance with one aspect of the invention, an apparatus for controlling access to the data memory comprises control processor interface means for coupling to said control processor; coprocessor interface means for coupling to the coprocessor; detection means, coupled to the control processor interface means, for detecting when the control processor requests access to the program memory and generating a first access control signal in response thereto; scheduling means, coupled to the coprocessor interface means, for detecting when the coprocessor requests access to the data memory and generating a second access control signal in response thereto; a switch, having a switch control input means, a first interface means for coupling to memory address, memory data and memory control signals associated with the control processor, a second interface means for coupling to memory address, memory data and memory control signals associated with the coprocessor, and a data memory interface means for coupling to the data memory, wherein the switch alternatively couples the first interface means and the second interface means to the data memory interface means in response to a switch control signal received from said control input; and arbitration means, coupled to the detection means, the scheduling means, and the switch, for generating a switch control signal in response to the first and second access control signals.

BRIEF DESCRIPTION OF THE DRAWINGS

These and other features, objects and advantages of the invention will be understood by reading the following detailed description in conjunction with the drawings in which.

DETAILED DESCRIPTION

Figure 1:
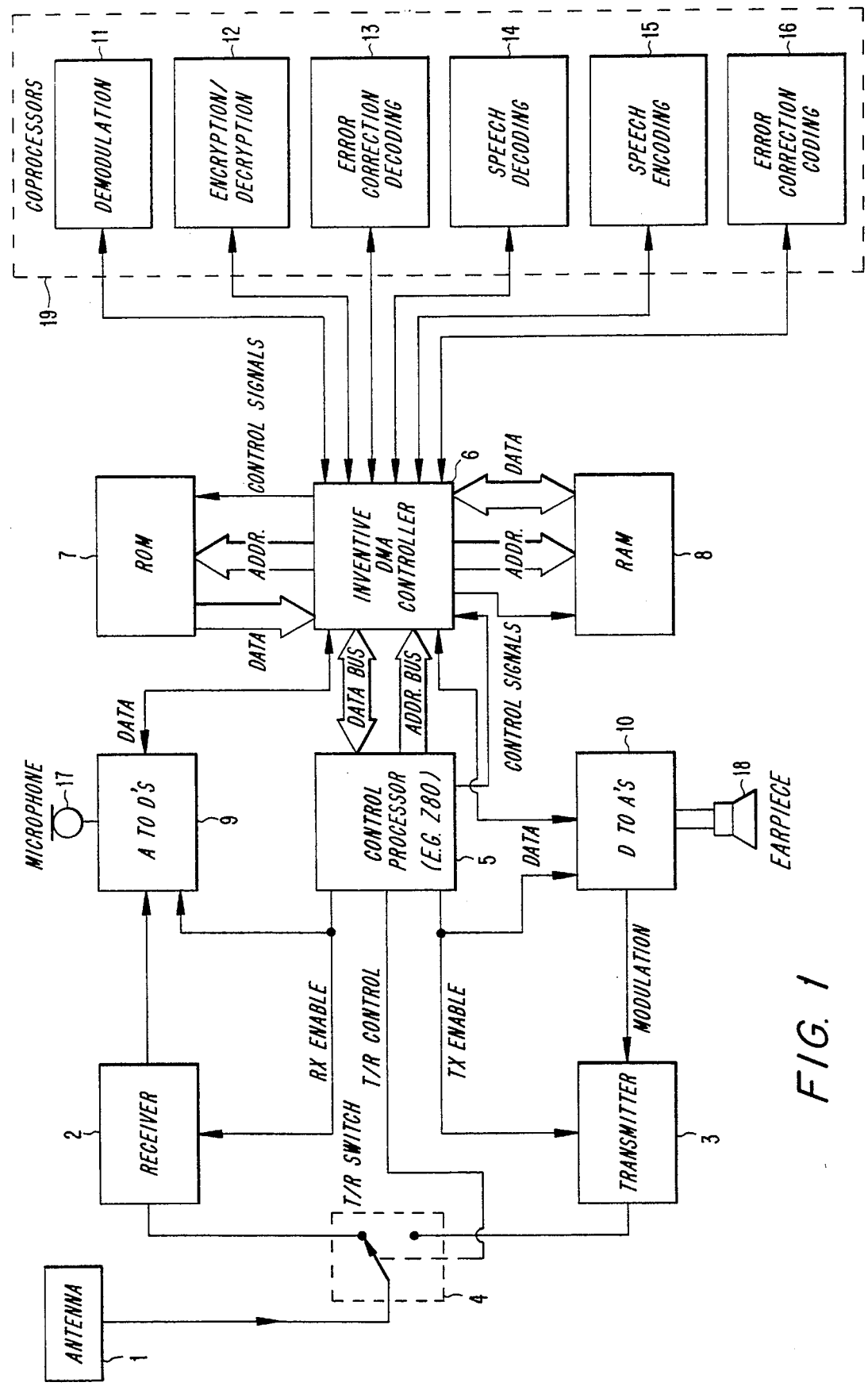
FIG. 1 is a block diagram of a Time Division Multiple Access (TDMA) digital portable cellular telephone incorporating features of the present invention.

The present invention relates to fast, special purpose computer architectures such as may be used to process acoustic, radio or radar data either for transmission or reception or both simultaneously. Such a computer architecture typically comprises a control processor, such as a general purpose microprocessor chip, which is used to orchestrate the activities of one or more special purpose signal processor chips. The present invention permits all processors to share a common random access memory (RAM) chip, so that the RAM chip may be used as the medium through which data already processed by one chip in one way is then made available to another chip to be processed in another way.

One feature of the present invention comprises creating a separate data bus for connection of the main processor to its data RAM, even when said processor is of the Von Neumann type, such as the Z80, that in itself provides only a single data bus. A switch is provided for connecting the exemplary Z80 Von Neumann computer bus to the data RAM when an access is required from that data RAM, and disconnecting it otherwise, in order to permit access by coprocessors. In contrast with the prior art, the computer is not (at least under normal circumstances) ever denied access to the data RAM when such access is needed, so no program deceleration is experienced. This is possible because ample opportunities are provided to the inventive DMA controller to effect its data RAM accesses without stealing computer cycles. The exemplary Z80 Von Neumann computer must, on a regular basis, seek its next program instruction from program memory (e.g. ROM) and its inherently single bus Von Neumann architecture cannot simultaneously request a RAM access. Therefore every instruction execution cycle of the computer provides a period during which the RAM is not accessed by the computer because the computer is at that time fetching an instruction from ROM.

In accordance with the present invention, the occurrence of the computer's "instruction fetch" cycle is detected in order to control the operation of a switch that isolates the data RAM from the computer's Von Neumann bus and connects it, instead, to the DMA controller bus through which other devices, such as peripheral controllers or coprocessors, can receive access. Many computers provide an "instruction fetch" indication signal which may be used for this purpose in the present invention. For example, the exemplary Z80 processor provides a signal called M1 which indicates the occurrence of an instruction fetch cycle. Other processors also provide such signals, but possibly in a different form, such as the S0, S1 mode signals of the 8085.

Alternatively, operation of the switch can be controlled by a signal that is derived from a detection that the processor is attempting to access a memory address that lies within a range associated with the data RAM. The non-assertion of such a signal would indicate that the data RAM can be isolated from the computer's Von Neumann bus, and connected, instead, to the DMA controller bus. This will be described in greater detail below.

The inventive DMA controller is thus synchronized to grant data RAM accesses to DMA devices by means of an instruction-fetch control signal from the host processor. In another aspect of the present invention, the DMA controller further comprises means to form a queue of DMA accesses requested by coprocessors on a first come, first served basis. The DMA controller can furthermore comprise means to form plural queues of access requests of like priority, the different queues having different priorities. A lower priority queue receives access grants only when all higher priority queues are empty. Alternatively, separate, linear queues of equal priority can be granted access opportunities according to a "round robin" scheduler.

In general it can be assumed that the average rate of DMA requests is easily matched by the average number of DMA opportunities available. As explained above, a DMA opportunity is presented every time the computer executes an instruction, and this typically occurs at a rate of at least 1 million per second. Thus, it is usually the case that capacity for 1 megabyte per second of DMA exists without slowing the microprocessor. It is even possible that two DMA accesses could be accommodated within the space of one instruction fetch, thus providing 2 megabytes/sec of DMA capacity.

In addition, it can transpire that a proportion of instructions each involve fetching two or three bytes from ROM, thereby giving time for several successive DMA accesses to RAM. Also, a proportion of instructions may not address RAM at all, but instead involve accesses only to ROM, EEPROM, internal registers or I/O ports. Thus a typical general purpose processor does not use more than a fraction of the available RAM bus bandwidth on average, even when running at full speed, so that a high proportion of the RAM bus bandwidth is available for coprocessors to use by means of the inventive DMA controller. On average, 2 to 4 Megabytes per second of DMA is more than sufficient to support many high speed peripheral devices or coprocessors such as real-time speech I/O devices, as included in the exemplary digital time division multiple access (TDMA) portable cellular telephone embodiment. Such coprocessors typically read a limited number of data bytes, and then use these data bytes in the performance of a great number of mathematical or logical operations to yield a limited number of results which are then stored back to data RAM via DMA. If typically forty mathematical operations were performed on each DMA'ed byte, then 1 megabyte/sec of DMA could support a coprocessor operating at a speed of 40 million instructions per second (MIPS). However, in general the possibility exists that a number of coprocessors may generate clumps of DMA requests at closely spaced times, thus filling the available queue space in the DMA controller. The inventive DMA controller typically would implement queues using a First-In-First-Out memory (FIFO). The FIFO memory size defines the maximum number of quasi-simultaneously received requests that can be queued without overflow. In the exemplary digital TDMA cellular telephone, a FIFO length of sixteen byte-entries gives adequate smoothing of DMA activity. However, those skilled in the art will recognize that the selection of an appropriate FIFO memory size is application dependent, and may therefore be different from the present example.

To provide more flexibility to handle clumped DMA requests more efficiently, the inventive DMA controller may also comprise means to violate the "no-contention" rule in order to serve a high priority DMA queue whose FIFO had become full. When a "FIFO FULL" indication signal is generated for such a queue, the DMA controller may be given a higher priority than the computer for data RAM accesses. An already started microprocessor RAM access is first allowed to run to completion, such completion being indicated, for example, by the removal of a read or write signal from the computer to the RAM. Then, if the computer next performs instruction fetch from ROM, then the RAM bus is freed and the DMA controller is granted access to the RAM. The DMA controller retains access until the queue is completely served and a FIFO EMPTY signal is generated for the queue. If, however, the microprocessor requests another data memory access instead of performing an instruction fetch from ROM, the request is placed on hold, by asserting a WAIT signal to the computer, until the FIFO EMPTY signal is asserted. If when the FIFO FULL signal was generated the computer was not addressing RAM, the DMA queue is granted immediate access and retains access until the queue is empty. If the computer was addressing RAM when the FIFO FULL signal was generated, the computer's operation is allowed to run to completion, and then if the following computer access request is also to RAM, It is denied and the computer placed on hold to give the DMA queue time to empty.

As an alternative to the above means of violating the non-contention strategy to handle an urgent group of DMA requests, an "interleaving" strategy can be employed whereby the DMA controller is allocated alternate RAM accesses with the computer whenever both require a series of successive accesses. The effect of this interleaving technique is a slowing of both the computer and the DMA controller instead of delaying the computer totally until the DMA queue is empty.

Whether a DMA queue receives no privileged treatment, full priority over the computer if a FIFO FULL signal is generated, or alternating priority with contending computer RAM access requests when the FIFO FULL signal has been generated depends on the priority level allocated to the DMA queue. The priority level can be fixed (hard-wired) or it can be programmed by the computer itself at setup or subsequently. By making the priority level programmable, great flexibility can be provided to dynamically change DMA priorities according to the application or current operating mode within an application.

In another aspect of the invention, the DMA queue priority level may also determine the priority of one DMA device's RAM access requests over other DMA requests in addition to determining priority over requests made by the processor. Such tiered priorities are known to the prior art in the context of interrupt prioritizing for allowing peripheral devices to interrupt an ongoing computer program to receive special attention. Prioritized interrupts are however never allowed to interrupt an instruction in mid-execution, as in the inventive DMA controller, nor do they cause an interrupt in order to receive direct access to memory. On the other hand, devices in the prior art which require direct access to memory do interrupt processor program execution. This is typically done by first asserting a "BUS REQUEST" signal to the microprocessor and then waiting until the microprocessor replies with a "BUS GRANT" signal. The microprocessor program execution in this prior art method is halted until the BUS REQUEST signal is removed.

An exemplary application of the present invention is shown in FIG. 1 as a Time Division Multiple Access (TDMA) digital portable cellular telephone. It will be readily apparent to those of ordinary skill in the art, however, that the various aspects of the present invention can be employed in any computer architecture in which a data RAM is to be shared by a microprocessor and one or more coprocessors, the microprocessor utilizing a different memory source for its program instructions. Thus, a complete description of the operation of a TDMA digital portable cellular telephone is not essential for a thorough understanding of the present invention. Instead, an overview of the operation of such a telephone is presented below for the main purpose of illustrating how the various aspects of the present invention can facilitate the interplay between a control processor, a number of coprocessors and a shared data memory.

Referring now to FIG. 1, the illustrated TDMA digital portable cellular telephone has two basic modes of operation: idle, and in conversation. In idle mode, the telephone listens to a calling or paging channel that is broadcast by the cellular network (not shown), but does not transmit. Signal processing activity is thus low during the idle mode, and the number of DMA requests per second is low.

In the conversation mode, the telephone receives TDMA signal bursts carrying coded, digitized speech information from the cellular network by means of the antenna 1 and the receiver 2. The telephone must buffer the digitized speech information, demodulate it, decode it and convert it to a continuous speech waveform. At more or less the same time, at least as perceived by the user, his speech is input from the microphone 17, digitized, coded and transmitted as data bursts in an allocated transmit timeslot. Transmit timeslots and receive timeslots are interleaved so that the telephone does not need to transmit and receive at the same time, thus facilitating the use of the same antenna 1. Thus during a TDMA frame period, a number of operations have to be performed as follows:

1. Use the transmit/receive (T/R) switch 4 to switch the antenna 1 to the receiver 2 and power up the receiver.
2. Receive a burst of analog signal in the receiver 2, use the analog-to-digital (A/D) converter 9 to digitize the burst signal, and transfer the digitized signal, via the DMA controller 6, into a buffer area of the data memory 8, then switch the antenna 1 to the transmitter 3 and power down the receiver.
3. Activate a burst demodulation coprocessor 11 to demodulate the burst stored in the buffer area of the data memory 8 and return demodulated results to the data memory 8.
4. Activate an encryption/decryption unit 12 to retrieve the next burst in sequence for transmission from the data memory 8, encipher it, and to store the enciphered data back into the memory 8.
5. Activate the transmitter 3 to transmit the next-in-sequence enciphered databurst. Data for this databurst is retrieved from the data memory 8, and converted into analog form prior to transmission by means of the digital-to-analog (D/A) converter 10.

6. After every execution of step 3, activate the encryption/ decryption coprocessor 12 to decipher the coded digital speech.

7. After every four operations of step 6 are complete, activate an error correction decoder coprocessor 13 to deinterleave and decode the deciphered results to produce decoded voice data or control data.

8. After each completion of step 7, activate a voice data decoder 14 to convert decoded voice data to a number of pulse code modulation (PCM) waveform samples and place them in a circular buffer in the data memory 8.

9. Meanwhile, every 125 µS extract one previously stored PCM sample from the data memory 8, convert it from digital into analog form by means of the D/A converter 10, and drive the earpiece 18 with the analog speech waveform; also every 125 µS, convert an analog waveform sample from the microphone 17 into a digital form by means of the A/D converter 9, and store it into the transmit speech circular buffer located in the data memory 8.

10. Every 20 mS, process 160 PCM samples from the transmit speech buffer to generate voice data and place voice data in memory.

11. Following every execution of step 10, activate a channel coder 16 to error-correction code the voice data and interleave coded data over a number of TDMA bursts and construct the bursts in sequence in the data memory 8.

It can be seen from the above that a number of coprocessors 19 need to be activated at different times, and that some processes are quasi-simultaneous or have uncertain timings. Because these asynchronous processes may generate a large number of access requests to the same memory, the DMA controller 6 may have to interleave the granting of such requests in accordance with the priority of the particular DMA channel. For example, the DMA controller 6 may have to maintain a regimen in which DMA channels of the highest priority making requests for access to the data memory 8 take precedence over the access requests made by lower priority channels and the control processor 5, and in which the requests made by DMA channels having equal priority are interlaced on a round robin basis among the DMA opportunities they are allocated. In the latter case, the DMA opportunities may either be granted precedence over requests made by the control processor 5 (when each of the DMA channels is of high priority), or they may be granted on an alternating basis with those made by the control processor 5 (when each of the DMA channels is of medium priority).

Some processes are only initiated contingent upon others or upon a defined number of another operation being completed. This orchestration is the function of the main computer or control processor 5. The control processor 5 activates the DMA controller 6 to deliver to or receive from one of the coprocessors 19 a defined number of bytes from or into the data memory 8 and also activates the coprocessor to perform the desired operation. The control processor 5 receives an interrupt from the DMA controller 6 when an operation is complete. The control processor 5 then determines if that shall trigger activation of another coprocessor and DMA activity. While the DMA controller 6 and the coprocessor are operating autonomously, the control processor 5 handles slower, lower priority tasks such as updating the user display and scanning the user keyboard, together referred to as the Man Machine Interface (MMI) (not shown).

The present invention is ideally suited to implement a system such as that which was described above. The exemplary application illustrated in FIG. 1 will now be described in further detail.

An antenna 1 is connected either to a transmitter 3 or a receiver 2 by means of a T/R switch 4 that is controlled by control processor 5. The control processor 5 is also capable of enabling the receiver 2 and A/D convertor 9 to receive a TDMA signal burst, digitize it preferably using the logpolar technique disclosed in U.S. Pat. No. 5,048,059 which is hereby incorporated by reference, and to enable a DMA controller 6, built in accordance with the present invention, to route digitized receive data into the random access data memory 8. The A/D convertor 9 is also coupled to a microphone 17 for the purpose of digitizing microphone signals which are also routed via DMA controller 6 to the data memory 8. The control processor 5 can also program the DMA controller 6 to generate an interrupt after a certain number of receive data samples have been collected, at which point the control processor 5 reactivates a demodulation coprocessor 11 to autonomously read back the received data from the data memory 8 with the aid of the inventive DMA controller 6, to process it at its own speed, and to store processed results back into the data memory 8 with the aid of the DMA controller 6. The control processor 5 may program the DMA controller 6 to generate an interrupt after the expected number of processed results from the demodulation coprocessor 11 have been DMAed into memory. The control processor 5 can then activate the encryption/decryption coprocessor 12 to similarly read results back from the data memory 8, decipher them, and return deciphered results to the data memory 8. In a preferred implementation, the deciphering operation is performed on the fly, between the results that are output from the demodulation coprocessor 11 and the DMA controller 6 in order to avoid excessive memory reads and rewrites. In such an implementation, the encryption/decryption coprocessor 12 would be part of the DMA controller 6, so that it could operate on data from the demodulation coprocessor 11 before it is stored back into the data memory 8, thus avoiding having that data written to the data memory 8, reread and then rewritten again.

In an alternative embodiment, the control processor 5 executes instead a software deciphering algorithm that directly operates on results stored in the data memory 8 to decipher them. These choices depend on the choice of encryption algorithm. Moreover, the DMA controller 6 of the present invention is capable of being reprogrammed by the control processor 5 to effect data routing in accordance with either of the above described decryption techniques, thus allowing the same hardware to perform either mode of decryption depending on circumstances.

After the deciphering operation, the DMA controller 6 may be preprogrammed to generate an interrupt to the control processor 5 indicating that a new block of deciphered data has been stored in memory. The control processor 5 may then increment a count of processed blocks and determine whether it is time to activate the error correction decoding coprocessor 13 to perform deinterleaving and decoding of the blocks together. If so, the DMA controller 6 is activated to deliver data for decoding to the error correction decoding coprocessor 13 and to receive an expected number of decoded results from that coprocessor for routing back to the data memory 8. The DMA controller 6 may be set to interrupt the control processor 5 when the expected number of results have been processed and stored into the data memory 8.

Operations which are analogous to the reverse of the above-described procedures are performed when it is necessary to generate a signal to be transmitted by the exemplary TDMA digital portable cellular telephone. It is worth pointing out, however, that in the embodiment in which the encryption/decryption coprocessor is located within the DMA controller 6, the encryption/decryption coprocessor preferably obtains data to be encrypted from a second coprocessor called the "burst builder" (not shown), which assembles encrypted data with syncwords and other control bits into the defined transmission format, converts the assembled burst to a modulating waveform represented by a sequence of numerical samples, and then outputs these to the D/A convertor 10 to thereafter modulate the transmitter 3. An internal burst builder, such as the one being discussed, would have to include a DMA address generator capable of retrieving data from locations in a sequence defined by an interleaving format generator.

The description of operation will not be continued further, as it should now be clear how the DMA controller 6 can be used by the host control processor 5 to orchestrate coprocessor activity either contingently or independently of other coprocessor activity, and to effect any desired intermediate results routing between coprocessors simply by programming memory start addresses where data is to be found for processing or placed after processing.

It will be noted that the control processor 5, which is for example a ZILOG Z80 having a Von Neumann type of architecture, has a single address bus and bidirectional data bus connection to the DMA controller 6. The inventive DMA controller 6 comprises means to connect the control processor buses to the ROM 7, which contains the program instruction sequence executed by the control processor 5. The DMA controller 6 also comprises means to connect the data and address buses of the data memory 8 to one or other of said coprocessors 19 when the control processor 5 is accessing the ROM 7, and means to connect the buses of the data memory 8 to the buses of the control processor 5 when requested by the control processor 5. Such a request is indicated if an address on the address bus of the control processor 5 corresponds to the address region associated with the data memory 8. For example, the data memory address region can be the address range 32,768–65,535, the address range 0 to 32,767 corresponding to addresses occupied by the ROM 7. To allow more than 32 k bytes of program to be stored in the ROM 7, the DMA controller 6 can incorporate a Memory Management Unit (MMU) that is a one-byte memory address extension register. This register can have an 8-bit byte written to it by an I/O or memory-mapped I/O instruction executed by the control processor 5 so as to select any one of up to 256 possible 16K byte segments of ROM to be mapped into the top half of the program memory address range, that is into the range 16,384–32,767, while always the same 16 k segment of ROM is mapped into the bottom half of the program memory range, that is 0–16,383. The reason for a permanently mapped part, called the root ROM, is that this contains the power start-up routine which can thus operate independently of the arbitrary switch-on contents of the MMU register. Moreover, the root-ROM can contain the permanent code needed to effect segment jumps between 16K ROM segments through manipulating the MMU. Such an MMU is known to the prior art and contained in the commercially available processor known as the 64180, sold by HITACHI.

Figure 2:
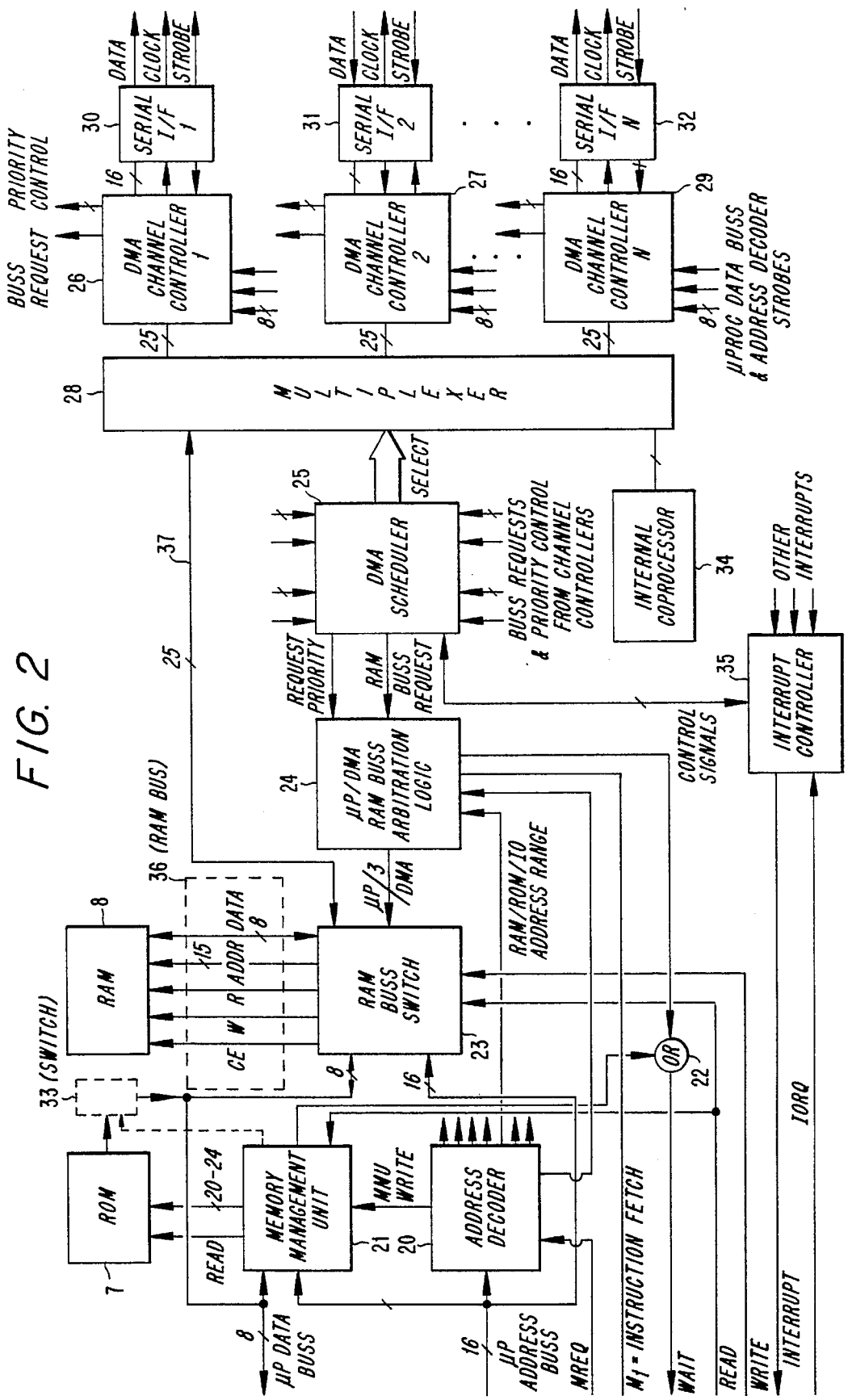
FIG. 2 is a block diagram of a DMA controller in accordance with the present invention.

Internal details of the inventive DMA controller will now be described with reference to FIG. 2.

An address decoder 20 detects the occurrence of special addresses or address ranges present on the 16-bit processor address bus. Address detection may be synchronized by a processor signal such as "MREQ" (when a Z80 microprocessor is present) or "ALE" (when an 8085 microprocessor is present). For example, one special address is an I/O address allocated to an 8-bit register (not shown) contained in the MMU 21. When this I/O address is detected on the address bus together with a control signal from the control processor 5 indicating an I/O operation, an 8-bit data value is transferred from the control processor 5 to the MMU register to be used in forming the most significant bits of the ROM address. When the address bits from the control processor 5 are detected to be in the ROM address range (e.g., the lower 32 k of address space defined by the address bus of the control processor 5) together with a READ control signal from the control processor 5, the control processor address bits (e.g. least significant 15 at least, in the exemplary case) are combined with the 8 bits that are output by the MMU 21 to form an extended address which can be between 20 and 24 bits wide, depending on implementation, thus permitting at least up to 1 megabyte of ROM to be addressed. Included in the 20–24 pins indicated to be connected from the MMU 21 to the ROM 7 is any control signal such as may be needed such as a CHIP ENABLE signal.

When it is detected that the control processor 5 is addressing the ROM 7, the RAM/ROM/IO ADDRESS RANGE signal to the RAM bus arbitration logic 24 is not active. The RAM bus arbitration logic 24 may then grant the DMA scheduler 25 access to the RAM bus 36 by switching the bus switch 23 to connect the DMA address and data buses and read/write control signals (all of which are associated with data memory accesses made by one of the coprocessors 19) to the data memory 8. If the processor address is detected to be in the range associated with the data memory 8 however, and control signals from the processor indicate that a read or write access is imminent, then the behavior of the RAM bus arbitration logic 24 is contingent upon priority signals received from the DMA scheduler 25 and upon the current state of the operation sequence. That is, any already started control processor data memory access is always allowed to complete a one-byte access, but it may be put on hold for an immediately following access if the DMA scheduler 25 indicates that a DMA request of appropriate priority is waiting. Typically control processors are able to accept a WAIT signal supplied to them for this purpose.

The DMA queues (FIFOs) (described below) are part of DMA channel controllers 26, 27, 29. Each of the channel controllers 26, 27, 29 is connected via a multiplexor 28, being a set of addressable switches, to the RAM bus 36. The multiplexor 28 is operated under control of the DMA scheduler 25 to connect a selected one of the DMA channel controllers 26, 27, 29 to the RAM bus switch 23. The 25-line connection 37 that is indicated in FIG. 2 typically includes a 15-bit address bus, an 8-bit bidirectional data bus and control signals to indicate read or write. Priority signals may be included if the priority associated with each DMA controller is not fixed but is instead received from an associated one of the coprocessors 19.

The DMA controller 6 is preferably implemented on the same chip as the control processor 5 in order to reduce pin count and power consumption. The ROM 7 and data memory 8 are typically external to this chip, but optionally part of the data memory 8 that is primarily addressed by DMA operations can advantageously be included on the same chip in order to reduce external accesses. Optionally, the switch 33 can be included on the chip to avoid toggling the ROM data bus when the microprocessor bus is switched by RAM bus switch 23 to address the data memory 8. The memory management unit 21 can be designed to avoid toggling the ROM address lines when the control processor 5 is addressing the data memory 8. Avoiding the unnecessary toggling of these lines reduces power consumption which is one advantage of splitting the RAM and ROM buses gained by the invention.

When many external coprocessors are to be connected to the chip, it is desirable also to minimize pin count by use of bit-serial interfaces. Many commercially available coprocessors, such as Texas Instruments TMS320-C53 or ANALOG DEVICES ADSP2101, have suitable serial interfaces. These interfaces transfer 16-bit words to and from the inventive chip using serial data lines. Bit transfer is synchronized with a clock line, and word boundaries are indicated by a strobe line. A chip built in accordance with the present invention can suitably include serial to parallel conversion interface circuits (serial I/F circuits) 30, 31, 32 to convert between the protocol of such serial interfaces and a 16-bit parallel word interface with the associated DMA channel controller 26, 27, 29. The channel controller performs conversion between a 16-bit coprocessor transfer and 8-bit DMA's, that is, one 16-bit transfer is handled as two, one-byte transfers to or from the data memory 8. Of course the wordlength of 16 bits and the data memory data width of 8 bits are merely exemplary and not meant to be restrictive.

The serial I/F circuits 30, 31, 32 are designed to implement either output or input. In either case, the bit clock accompanying data transfer can flow either from a corresponding one of the coprocessors 19 to a respective one of the serial I/F circuits 30, 31, 32 or vice versa. Likewise, the word strobe can flow in either direction. Clock and strobe directions can suitably be made programmable so that a serial I/F circuit is as generally useful as possible for interfacing with a range of coprocessors. Serial I/F circuit 30 in FIG. 2 is shown as a serial output with the I/F circuit being the source of clock and strobe. This means that the DMA controller 6 controls the interface to determine when the associated one of the coprocessor 19 shall receive and accept a serial word transfer. The serial I/F circuit 31 on the other hand is shown as an input. However, the clock is supplied by the inventive chip to the corresponding one of the coprocessors 19, but the coprocessor is now the source of the strobe. The strobe line is toggled from low to high, for example, to signify that the coprocessor is requesting a transfer. If the corresponding DMA channel controller 27 can accept the transfer (i.e. FIFO not full), it allows the serial interface to send a clock to the coprocessor which then clocks out 16 bits of data and then pulls the strobe low. The coprocessor in that case decides when it has finished a computation and wishes to transfer it to memory, but the DMA controller 6 is not obliged to accept it immediately if there is a bottleneck to the data memory 8. The whole intent, however, of the inventive arrangement is to ensure that as far as possible such bottlenecks do not occur and that even if a data memory bottleneck occurs, unless the FIFO buffer is also full it is not necessary to delay coprocessor activity.

A third type of interface is illustrated by serial I/F circuit 32. This is an output but the strobe direction is from the coprocessor to the inventive chip while the clock flows in the reverse direction. This allows the coprocessor to request an output, but allows the DMA channel controller 6 to delay output if not immediately available by delaying the sending of the clock to the coprocessor.

If a coprocessor such as the internal coprocessor 34 is included on-chip, which may for example be encryption/decryption logic, no serial interface is required. A parallel interface can be provided on chip which can also allow both reads and writes from/to the data memory 8.

Figure 3:
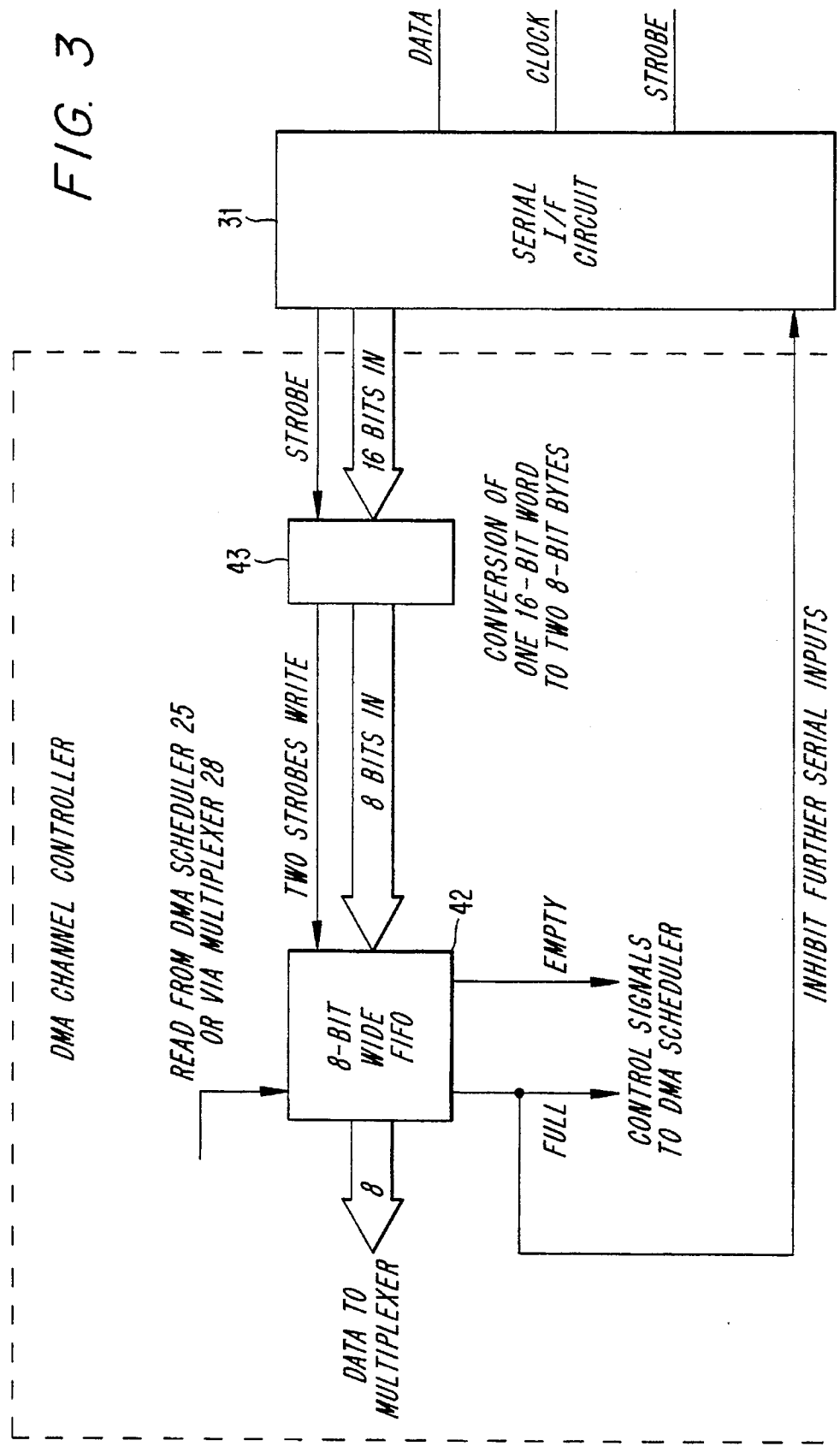
FIG. 3 is a block diagram of a DMA channel controller in accordance with the present invention.
Figure 4:
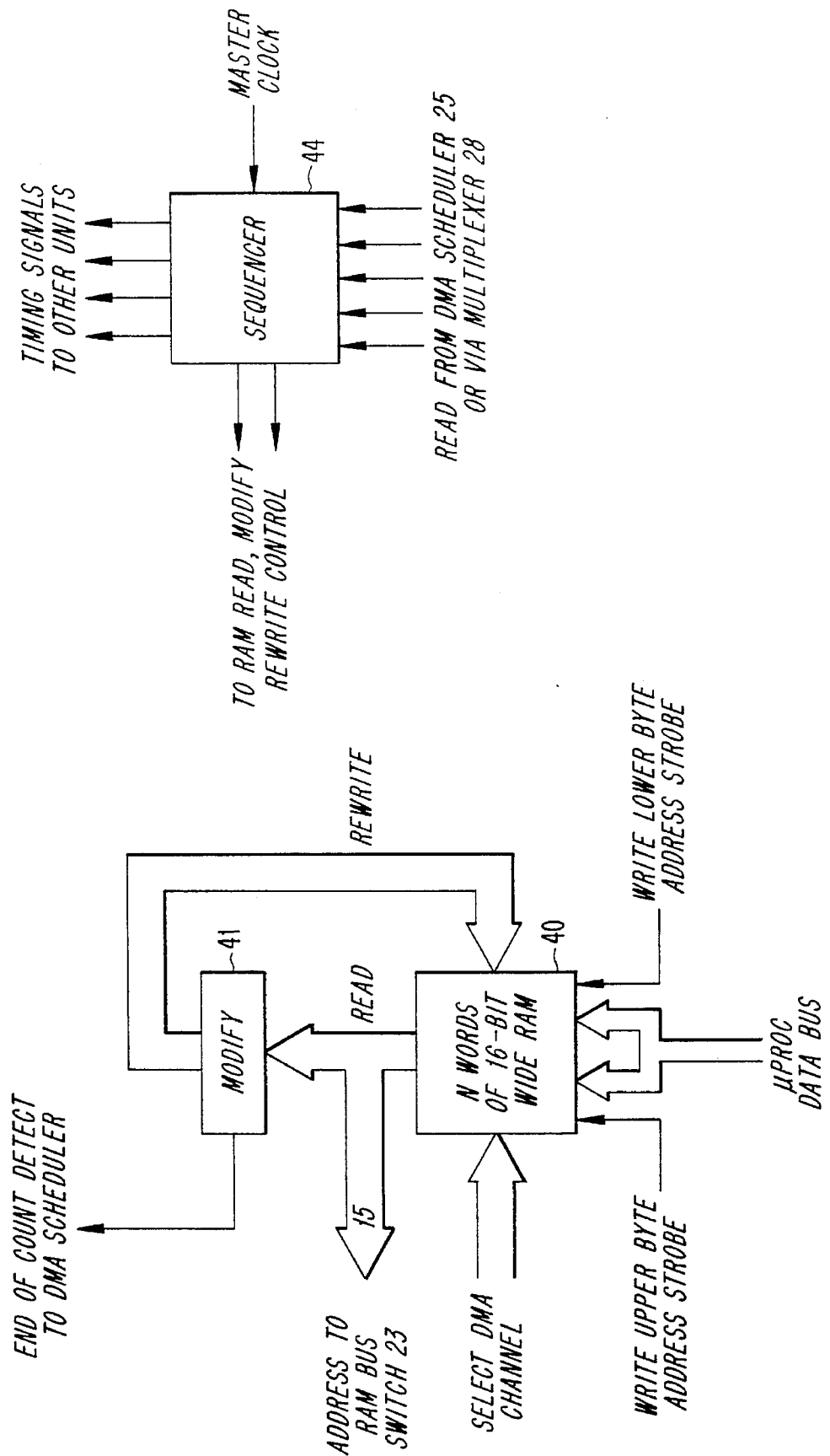
FIG. 4 is a block diagram of a structure for DMA counters in accordance with the present invention.

A more detailed description of a suitable DMA channel controller and associated features will now be presented with reference to FIGS. 3 and 4. As mentioned earlier, the control processor 5 orchestrates coprocessor data transfer one to another by setting data memory addresses from which they will take data for processing or to which they will deliver processed results. The data memory starting address, which may typically be treated as a 16 bit quantity even if only 15 of the bits convey meaningful information, is written by a control microprocessor two-byte I/O operation to a 16-bit counter. As shown in FIG. 4, such counters for several DMA channel controllers 26, 27, 29 may advantageously be collected into a small on-chip RAM 40 as this is a silicon-area-efficient solution. The RAM 40 may advantageously be implemented as part of the multiplexor 28, so that the interface between the multiplexor 28 and each of the DMA channel controllers 26, 27, 29 can be reduced from the twenty-five lines shown in FIG. 2 down to only eight lines conveying data. The remaining address information for eventual placement on the RAM bus 36 comes from the RAM 40.

The counter operation (increment or decrement) of the RAM 40 may be implemented by a RAM read/modify and rewrite cycle using the modification logic 41 and the sequencer 44 for generating appropriate control signals. The modification logic 41 can contain an end of count detector that can be one of three types: (1) it can be programmed to detect a certain 16-bit address from the on-chip RAM 40, (2) the on-chip RAM 40 can be width-expanded to include a counter that is preset to a number of bytes to be transferred and is always decremented by the modification logic 41, or (3) it can include detection of a specific data pattern transferred from the serial interface circuit 31 signifying end-of-transfer. In all cases, end of count or end of transfer, when detected, is sent to the DMA scheduler 25 that sets the DMA channel inactive until reactivated and also, if this feature is selected, generates an interrupt to the control processor 5 via the interrupt controller 35 (see FIG. 2).

The read/modify/rewrite sequence is triggered by receipt of any read signal from the DMA scheduler 25 to sequencer 44 indicating that a DMA access to the data memory 8 has been granted. It is obvious and well known to those having ordinary skill in the art that the implementation of complex and fast logic circuits benefits from the use of a master clock to sequence and synchronize operations in various parts of the circuit. It is impractical to describe every such logic detail of a chip with a logic gate count approaching 100,000, but it may be assumed that the sequencer 44 embraces all such sequencing and timing requirements that are derived from a 13 MHz master clock.

The DMA channel to which the access has been granted also receives the read signal to its FIFO 42 (FIG. 3) which outputs the next byte in sequence and tests if it is now empty. An EMPTY signal will remove that channel from the list that the DMA scheduler 25 attempts to serve, and no further reads to the FIFO 42 will be received until the EMPTY signal disappears due to a further serial input via the serial input circuit 31. The EMPTY signal occurrence would also reset any priority that the DMA channel may previously have been accorded through the FULL signal having been generated.

On the other hand, the nonassertion of the EMPTY signal may be used by the DMA scheduler 25 as an indication that a bus request is present.

A number of conceivable DMA priorities have already been mentioned, and they are repeated below in a list which is not necessarily exhaustive.

1) HIGH PRIORITY DMA "QUEUE FULL" priority control signal causes the DMA controller 6 to be given absolute priority over control processor data memory accesses and lower priority DMA's until "QUEUE EMPTY" priority control signal is generated from the DMA channel controller.

2) MEDIUM PRIORITY DMA "QUEUE FULL" signal elicits alternating priority with control processor bus accesses or higher priority DMAs not in "QUEUE FULL" condition until the QUEUE EMPTY signal is generated. received. Control processor bus accesses only interleave with DMA accesses if they are needed; otherwise the DMA gets successive accesses with priority over all except higher priority DMA's of type (1).

3) LOW PRIORITY DMA QUEUE FULL receives access to the RAM bus 36 that alternates with control processor bus accesses or higher priority DMA accesses whose queues are not full, on a round-robin basis.

4) LOWEST PRIORITY DMA QUEUE FULL does not receive higher priority but instead causes a WAIT signal to be sent to the associated DMA channel controller which, if necessary, relays it to the associated coprocessor to inhibit further entries into the queue FIFO.

Figure 5:
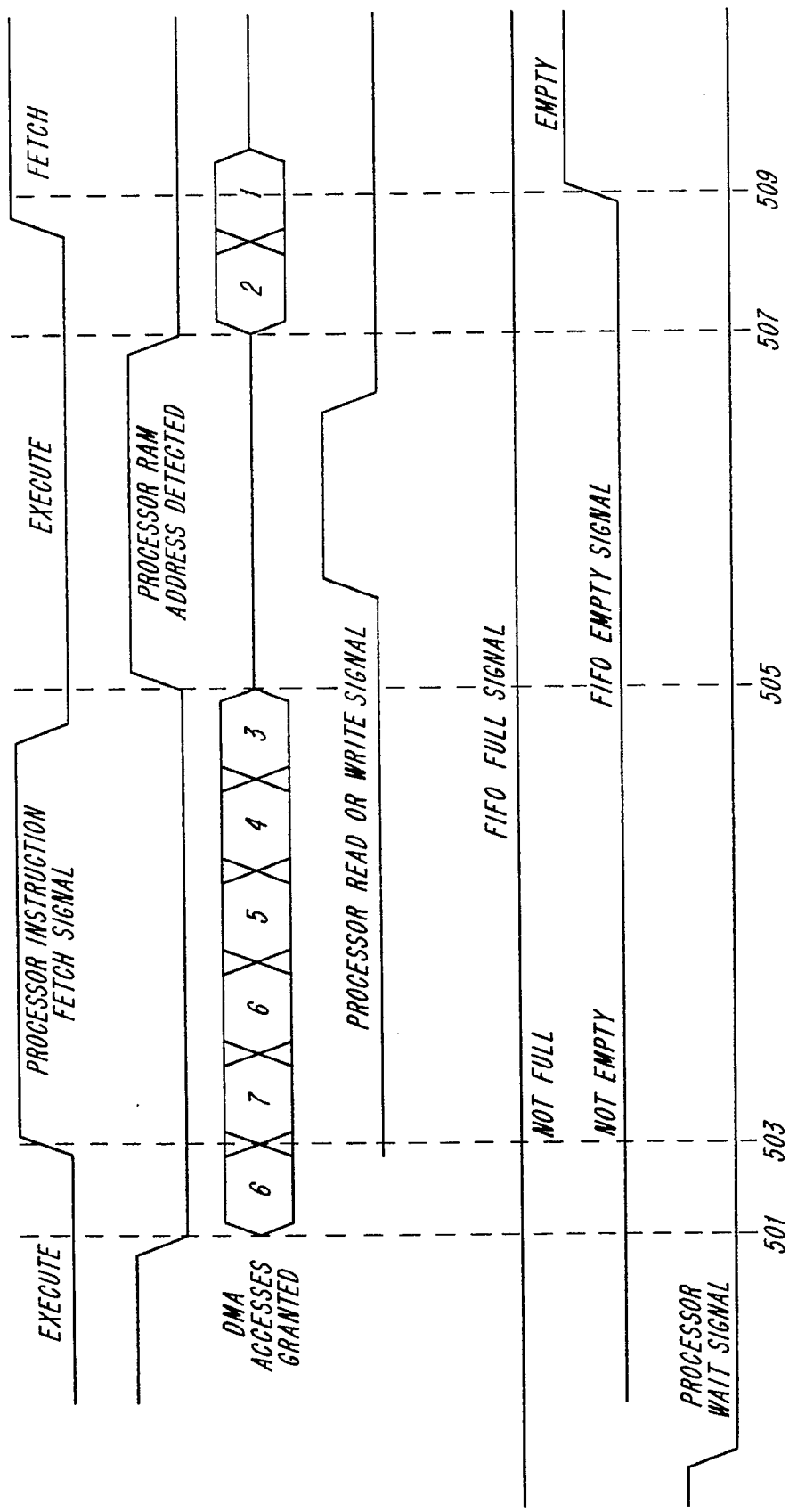
FIGS. 5–9 illustrate various timing examples in conjunction with DMA priority schemes in accordance with the present invention.

The timing associated with DMA priority schemes in accordance with the present invention will now be described with reference to FIGS. 5–9. FIG. 5 shows DMA accesses granted in the case where DMA has normal priority, that is, cases in which the FIFO FULL signal has not been asserted. At point 501, the FIFO contains a queue of six accesses awaiting service. The six accesses may just have arrived in a clump from one or more coprocessors, or they may have accumulated in the FIFO during the time that the control processor 5 was using the data memory 8. However, at point 501, a first DMA access is granted. This may be due to an allowed multiplexing of processor and DMA accesses, or it may be due to the start of a new processor instruction fetch cycle. The timing diagrams in FIG. 5 show that DMA accesses start just prior to the instruction fetch signal, indicating that the access starting at point 501 results from a multiplexing of DMA accesses with a prior series of accesses of the data memory 8 by the control processor 5. At point 503 however, the assertion of the instruction fetch signal indicates that DMA may have continuous access to the data memory 8 if needed, without multiplexing with control processor accesses. If the control processor 5 is permitted to fetch instructions from the data memory 8 (depending on the architecture and what restrictions may have been given to programmers) the "RAM address detected" signal must also be low as well as Instruction fetch being high (an AND function) in order to terminate multiplexing.

In the example illustrated in FIG. 5, the queue length has meanwhile increased to seven at point 503, due to DMA accesses piling up faster than they can be serviced. However the FIFO did not become full, as indicated by the continued low state of the FIFO FULL signal. At point 503, DMA receives continuous access grants and the queue length of the FIFO rapidly diminishes from seven to six, then five, four and three. Then at point 505, the processor is detected to be generating a data memory address during instruction execution (note that the Processor Instruction Fetch signal has not been asserted). Since the FIFO has not been full since the last EMPTY signal was generated, the processor receives priority over DMA accesses at point 505, and generates a READ or WRITE signal. Then, at point 507, DMA receives an allowed multiplex access. Instruction fetch resumes just before point 509, thereby allowing the remaining DMA access in the queue to be serviced. This results in the FIFO empty signal appearing at 509. Even though access to the data memory 8 is available for DMA at this point because instruction fetch is underway, there are no DMA's in the queue requiring access at this time.

Figure 6:
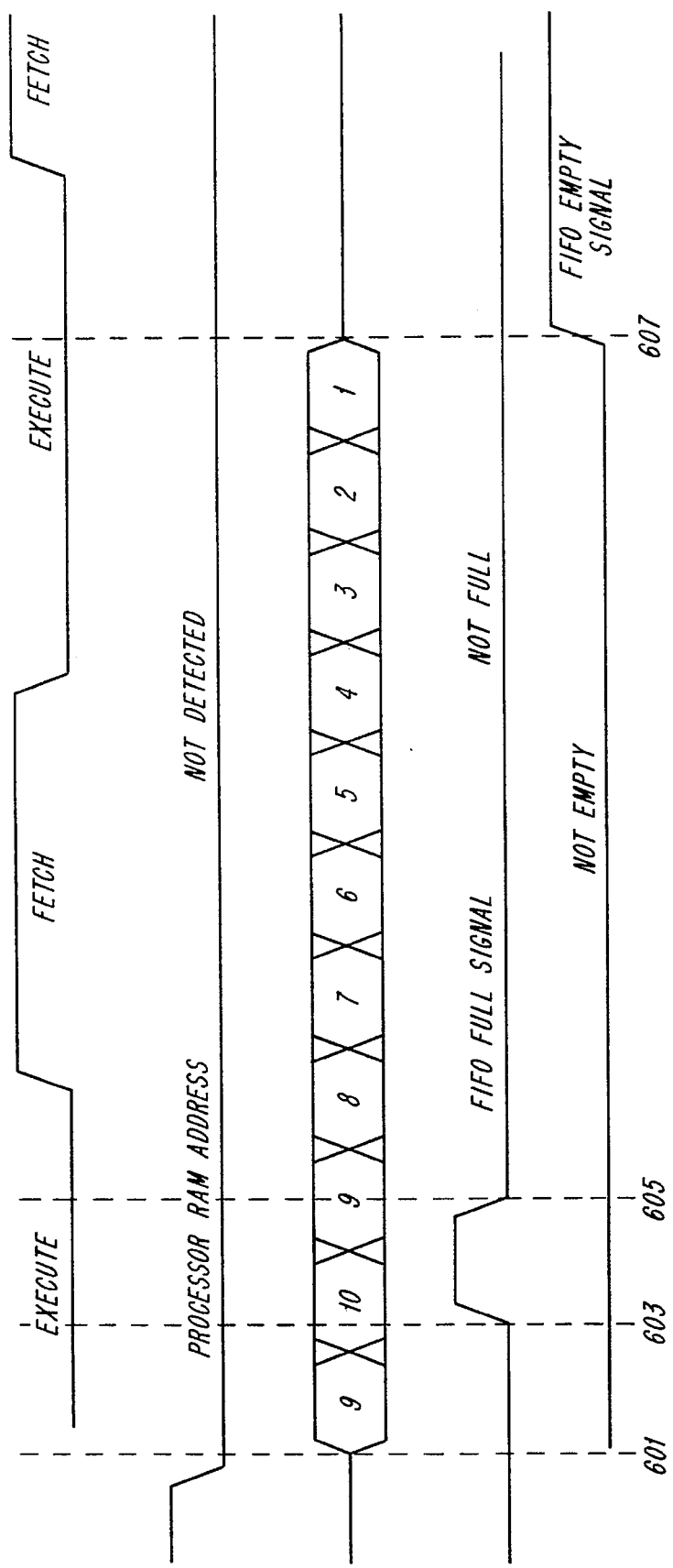

FIG. 6 shows the timing in the event that the FIFO becomes full, but since the control processor's instruction execution does not address the data memory 8, the FIFO may be emptied without the need to put the processor temporarily into a WAIT state.

At point 601, nine accesses are waiting and DMA begins. Due to more DMA's piling up after one access has been granted there are now ten requested accesses waiting at point 603 and the FIFO FULL signal is generated. However, since the control processor 5 does not address the data memory 8 at all during either of the instruction execution periods or the fetch period between points 605 and 607, DMA receives continuous accesses to the data memory 8, thereby enabling the queue to be completely serviced until the EMPTY signal appears at point 607. The assertion of the EMPTY signal at point 607 terminates DMA accesses. It can be seen that the control processor 5 was not slowed at all during this time because there was no conflict for access to the data memory 8.

Figure 7:
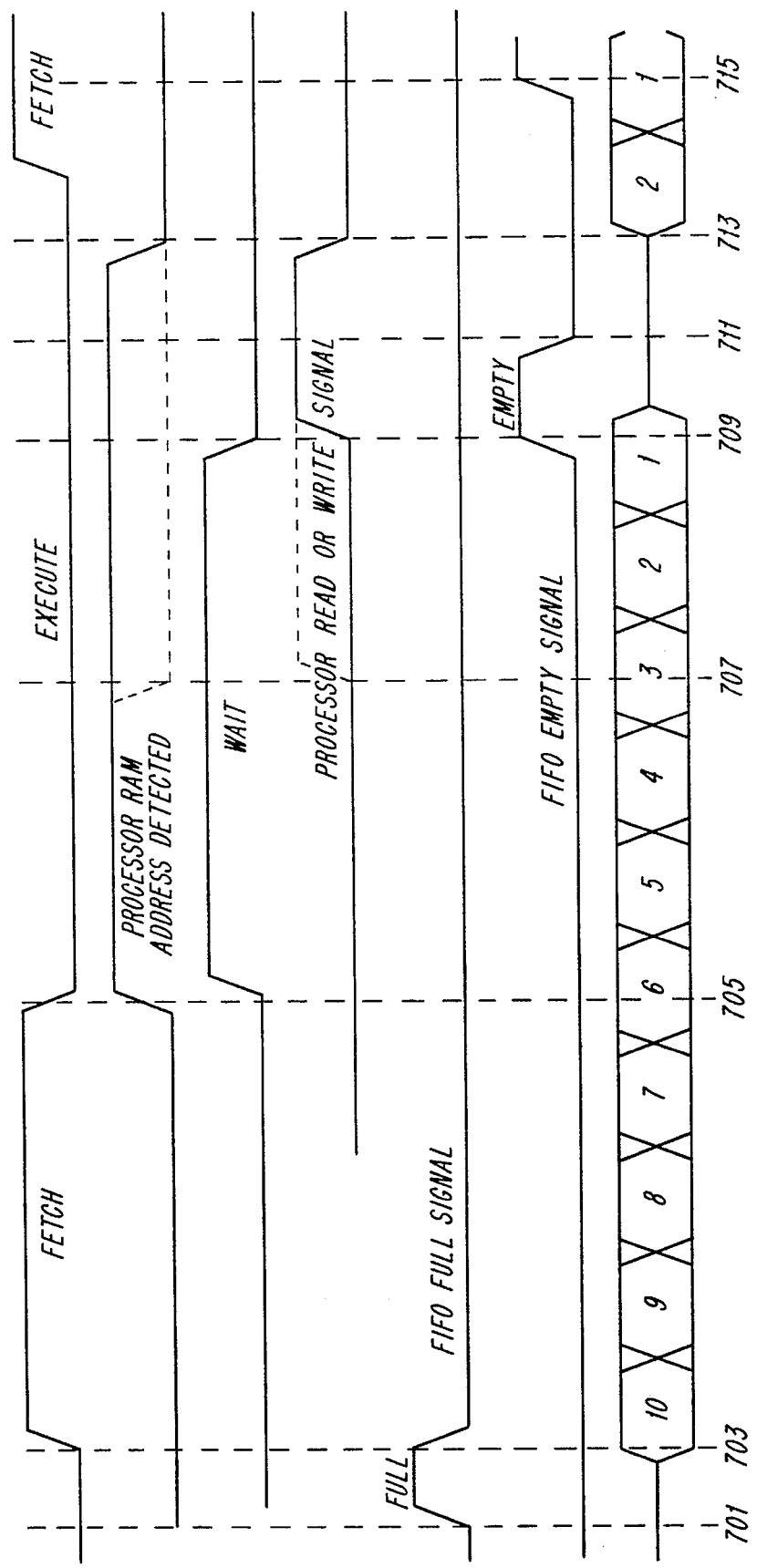
Figure 8:
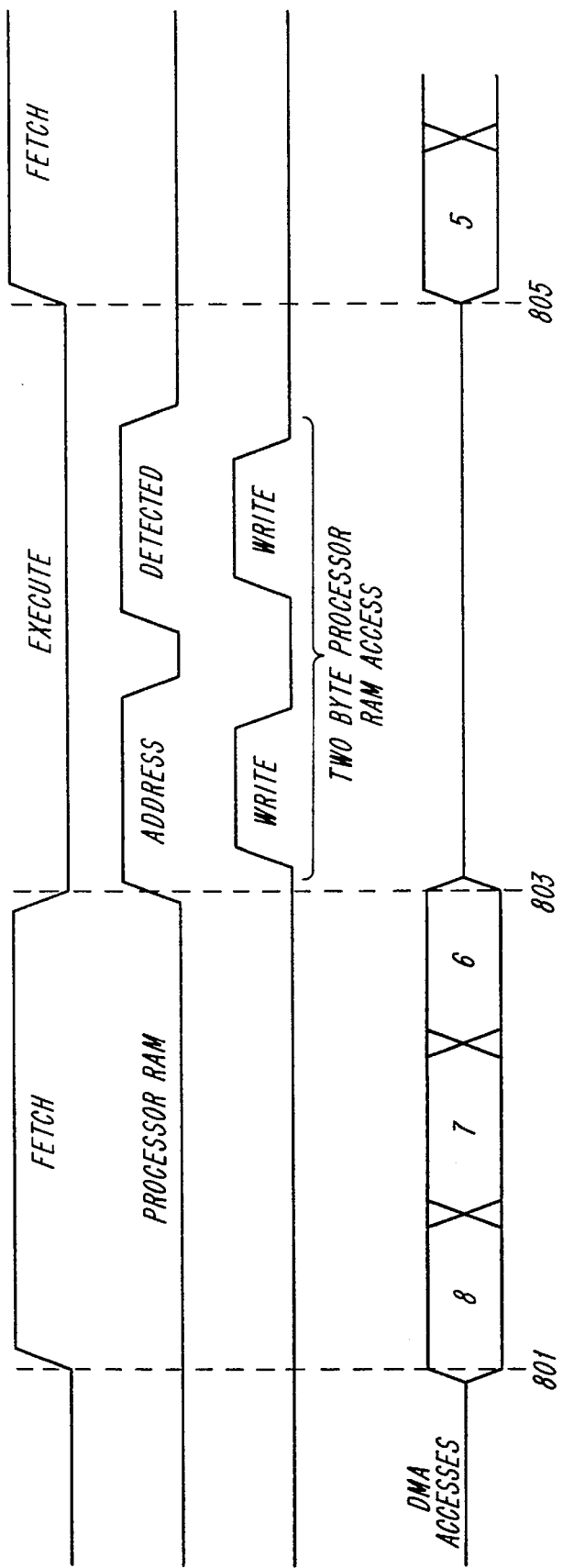

FIG. 7 shows the timing that occurs when a high priority DMA request, caused by a FIFO FULL condition, conflicts with control processor accesses of the data memory 8. At point 701, the FIFO has become full, but immediately afterwards, at point 703, DMA starts to receive accesses due to the execution by the control processor 5 of an instruction fetch (indicated by the assertion of the Instruction Fetch signal). If the control processor 5 had in fact been addressing the data memory 8 at point 703, the control processor access would have been allowed to be completed but a subsequent access by the control processor 5 of the data memory 8 would have yielded to DMA, which would then in any case have received priority at point 703. After the first access (i.e., when ten requests are queued up in the FIFO) is granted, the FIFO is no longer full but still not empty. Therefore, DMA accesses continue. When the processor attempts to access the data memory 8 at point 705, DMA retains priority and the WAIT signal is generated to the control processor 5, resulting in prolongation or delay of its address and control signals (i.e. READ or WRITE) until all DMA's have been serviced. Eventually, the FIFO becomes empty, and the EMPTY signal is generated at point 709. In response, the WAIT signal is reset, thereby allowing the control processor's delayed data memory access to take place.

At point 711, more DMA requests have been received after the FIFO was last emptied so the EMPTY signal disappears. However since the DMA priority has been reset to normal, DMA does not take precedence over data memory accesses by the control processor 5, and a new DMA access is not granted until point 713 after a control processor data memory access is completed. This is a "multiplex" access, allowed because the data memory 8 is fast enough to alternate DMA and control processor requests. If the data memory 8 is not fast enough to allow such multiplexing, the new DMA access would have to wait for the processor instruction fetch to begin. The new DMA accesses however are soon fulfilled and the EMPTY signal appears again at point 715, thereby terminating DMA.

It can be seen from the timing diagrams of FIGS. 5 and 6 that the present invention provides substantial DMA capacity without ever slowing the processor. The timing diagram illustrated in FIG. 7 illustrates how a large clump of quasi-simultaneous DMA requests are handled by the present invention with only modest (e.g., single WAIT state) slowing of the control processor 5. However once DMA has obtained priority, retaining it until the FIFO is empty ensures that the processor is unlikely to be caused to wait again for some time, that is, until a large number of DMA requests have again appeared quasi-simultaneously and faster than DMA access grant opportunities naturally arose. It is a purpose of the invention to minimize the likelihood of such events so that both DMA and processor needs are served without slowing each other.

Figure 9:
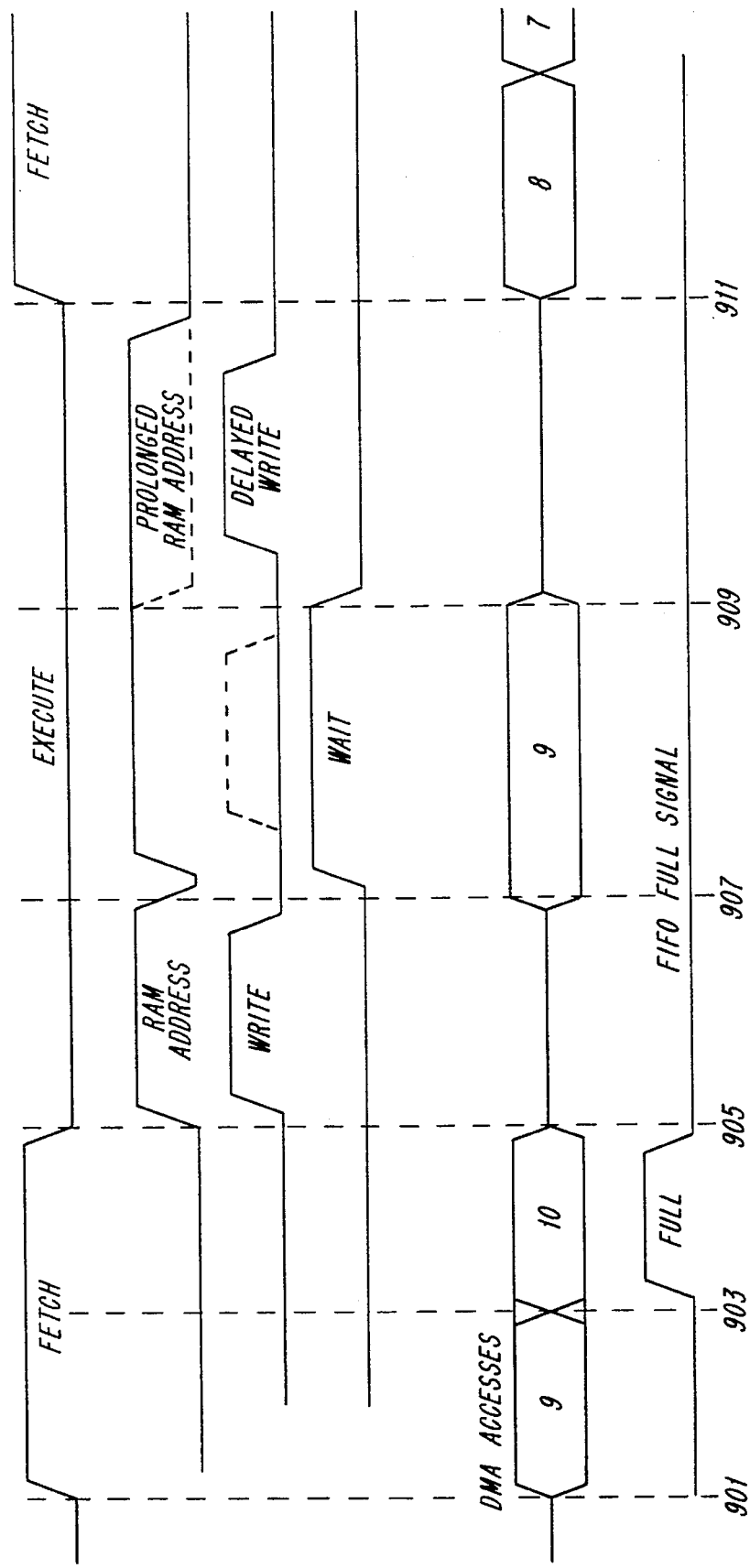

Considering further the case where the speed of the data memory 8 is fully utilized, so that multiplexing alternate control processor and DMA accesses is not possible without speed loss, serves better to illustrate the use of the access control and priority signals. In this case, DMA starts to receive accesses, if the FIFO queue is not empty, normally upon the processor instruction fetch signal being detected, as shown at point 801 in FIG. 8. Three DMA's are performed before the processor addresses the data memory 8 at point 803. The control processor 5 then receives priority and retains priority for two successive data memory accesses, or however many it needs, the control processor priority only being reset by the next instruction fetch signal, or control processor priority being preempted by appearance of a FIFO FULL signal. If the latter occurs, alternative types of DMA priority may be granted as disclosed above. The highest DMA priority is that which receives all data memory accesses until its FIFO EMPTY signal appears. A slightly lower DMA priority channel can alternatively receive alternating accesses with the control processor 5 until its FIFO EMPTY signal appears. This case is shown in FIG. 9.

At point 901, DMA is granted access to serve its queue of nine waiting access requests. However more DMA requests are received so that at point 903 the FIFO FULL signal is generated. Despite this, the control processor 5 receives access to the data memory 8 at point 905 because DMA has just had a turn. However, after one of the pair of control processor accesses involved in executing the instruction, DMA receives another access at point 907 and a WAIT signal is generated to the processor. Even though the FIFO EMPTY signal has not yet appeared to cause the DMA priority to be reset to normal, the control processor 5 receives the next access to the data memory 8 at point 909 because DMA has just had a turn. This alternating processor/DMA behavior characterizes this type of DMA priority. At point 911, DMA receives accesses for a different reason, namely that the control processor 5 is performing instruction fetch from ROM 7, so the RAM bus 36 is free. If this does not permit the DMA queue to be emptied before the control processor 5 next requests access to the data memory 8, the control processor 5 will receive data memory accesses alternating with DMA accesses once more, until the FIFO EMPTY signal resets DMA priority to normal.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a system including a control processor, a coprocessor, a program memory and a data memory, said control processor accessing said program memory during an instruction fetch cycle and said data memory during an instruction execution cycle, an apparatus for controlling access to said data memory, said apparatus comprising:

control processor interface means for coupling to said control process;

coprocessor interface means for coupling to said coprocessor;

detection means, coupled to said control processor interface means, for detecting when said control processor requests access to said program memory and generating a first access control signal in response thereto;

scheduling means, coupled to said coprocessor interface means, for detecting when said coprocessor requests access to said data memory and generating a second access control signal in response thereto;

a switch, having a switch control input means, a first interface means for coupling to memory address, memory data and memory control signals associated with said control processor, a second interface means for coupling to memory address, memory data and memory control signals associated with said coprocessor, and a data memory interface means for coupling to said data memory, wherein said switch alternatively couples said first interface means or said second interface means to said data memory interface means in response to a switch control signal received from said control input; and arbitration means, coupled to said detection means, said scheduling means, and said switch, for generating a switch control signal only in response to said first and second access control signals, wherein said instruction fetch and instruction execution cycles are mutually exclusive.

2. The apparatus of claim 1, wherein said control processor interface means includes an interface for a memory address signal generated by said control processor, and wherein said detection means generates said first access signal in response to said memory address signal designating a memory address that is not within a range of memory addresses associated with said data memory.

3. The apparatus of claim 1, wherein said control processor interface means includes an interface for a control processor state signal generated by said control processor, and wherein said detection means generates said first access signal in response to said control processor state signal designating an instruction fetch operation by said control processor.

4. In a system including a control processor, a coprocessor, a program memory and a data memory, said control processor accessing said program memory during an instruction fetch cycle and said data memory during an instruction execution cycle, an apparatus for controlling access to said data memory, said apparatus comprising:

control processor interface means for coupling to said control processor;

coprocessor interface means for coupling to said coprocessor;

channel control means, coupled to said coprocessor interface means, and including first in first out (FIFO) memory means, said channel control means storing in said FIFO memory means data associated with a coprocessor request for access to said data memory and asserting a FIFO full signal in response to said FIFO memory means being full;

detection means, coupled to said control processor interface means, for detecting when said control processor requests access to said program memory and generating a first access control signal in response thereto;

scheduling means, coupled to said channel control means, for generating a second access control signal in response to a coprocessor request for access to said data memory, and for generating a priority signal in response to said FIFO full signal being asserted;

a switch having a switch control input means, a first interface means for coupling to memory address, memory data and memory control signals associated with said control processor, a second interface means for coupling to memory address, memory data and memory control signals associated with said coprocessor, and a data memory interface means for coupling to said data memory, wherein said switch alternatively couples said first interface means or said second interface means to said data memory interface means in response to a switch control signal received from said control input; and arbitration means, coupled to said detection means, said scheduling means, and said switch, for generating a switch control signal only in response to said first and second access control signals and said priority signal, wherein said instruction fetch and instruction execution cycles are mutually exclusive.

5. The apparatus of claim 4, wherein said control processor interface means includes an interface for a memory address signal generated by said control processor, and wherein said detection means generates said first access signal in response to said memory address signal designating a memory address that is not within a range of memory addresses associated with said data memory.

6. The apparatus of claim 4, wherein said control processor interface means includes an interface for a control processor state signal generated by said control processor, and wherein said detection means generates said first access signal in response to said control processor state signal designating an instruction fetch operation by said control processor.

7. The apparatus of claim 4, wherein said scheduling means generates said second access control signal in response to nonassertion of a signal indicative of said FIFO memory means being empty.

8. The apparatus of claim 4, wherein said priority signal designates one of a plurality of priority levels, said priority levels including a high priority level, and wherein said scheduling means generates a priority signal designating said high priority level in response to said FIFO full signal being asserted.

9. The apparatus of claim 8, wherein, in response to said priority signal being a high priority signal, said generated switch control signal causes said switch to couple said second interface means to said data memory interface means whether or not said first access control signal is asserted.

10. In a system including a control processor, a coprocessor, a program memory and a data memory, said control processor accessing said program memory during an instruction fetch cycle and said data memory during an instruction execution cycle, wherein said instruction fetch and instruction execution cycles are mutually exclusive, an apparatus for controlling access to said data memory, said apparatus comprising:

control processor interface means for coupling to said control processor;

coprocessor interface means for coupling to said coprocessor;

channel control means, coupled to said coprocessor interface means, and including first in first out (FIFO) memory means, said channel control means storing in said FIFO memory means data associated with a coprocessor request for access to said data memory and asserting a FIFO full signal in response to said FIFO memory means being full;

detection means, coupled to said control processor interface means, for detecting when said control processor requests access to said program memory and generating a first access control signal in response thereto;

scheduling means, coupled to said channel control means, for generating a second access control signal in response to a coprocessor request for access to said data memory, and for generating a priority signal in response to said FIFO full signal being asserted;

a switch having a switch control input means, a first interface means for coupling to memory address, memory data and memory control signals associated with said control processor, a second interface means for coupling to memory address, memory data and memory control signals associated with said coprocessor, and a data memory interface means for coupling to said data memory, wherein said switch alternatively couples said first interface means or said second interface means to said data memory interface means in response to a switch control signal received from said control input; and arbitration means, coupled to said detection means, said scheduling means, and said switch, for generating a switch control signal only in response to said first and second access control signals and said priority signal, wherein said priority signal designates one of a plurality of priority levels, said priority levels including a high priority level, and wherein said scheduling means generates a priority signal designating said high priority level in response to said FIFO full signal being asserted, and wherein said arbitration means, in response to said priority signal being a high priority signal, generates a coprocessor select switch control signal that causes said switch to couple said second interface means to said dam memory interface means whether or not said first access control signal is asserted, and then continues to generate said coprocessor select switch control signal until a signal indicative of said FIFO memory means being empty is detected.

11. In a system including a control processor, a coprocessor, a program memory and a data memory, said control processor accessing said program memory during an instruction fetch cycle and said data memory during an instruction execution cycle, an apparatus for controlling access to said data memory, said apparatus comprising:

control processor interface means for coupling to said control processor;

coprocessor interface means for coupling to said coprocessor;

channel control means, coupled to said coprocessor interface means, and including first in first out (FIFO) memory means, said channel control means storing in said FIFO memory means data associated with a coprocessor request for access to said data memory and asserting a FIFO full signal in response to said FIFO memory means being full;

detection means, coupled to said control processor interface means, for detecting when said control processor requests access to said program memory and generating a first access control signal in response thereto;

scheduling means, coupled to said channel control means, for generating a priority signal in response to said FIFO full signal being asserted;

a switch having a switch control input means, a first interface means for coupling to memory address, memory data and memory control signals associated with said control processor, a second interface means for coupling to memory address, memory data and memory control signals associated with said coprocessor, and a data memory interface means for coupling to said data memory, wherein said switch alternatively couples said first interface means or said second interface means to said data memory interface means in response to a switch control signal received from said control input; and arbitration means, coupled to said detection means, said scheduling means, and said switch, for generating a switch control signal only in response to said first access control signal and said priority signal, wherein said instruction fetch and instruction execution cycles are mutually exclusive.

12. The apparatus of claim 11, wherein said control processor interface means includes an interface for a memory address signal generated by said control processor, and wherein said detection means generates said first access signal in response to said memory address signal designating a memory address that is within a range of memory addresses associated with said data memory.

13. The apparatus of claim 11, wherein said control processor interface means includes an interface for a control processor state signal generated by said control processor, and wherein said detection means generates said first access signal in response to said control processor state signal designating an instruction fetch operation by said control processor.

14. The apparatus of claim 11, wherein said scheduling means generates said priority signal in response to nonassertion of a signal indicative of said FIFO memory means being empty.

15. The apparatus of claim 11, wherein said priority signal designates one of a plurality of priority levels, said priority levels including a high priority level, and wherein said scheduling means generates a priority signal designating said high priority level in response to said FIFO full signal being asserted.

16. The apparatus of claim 15, wherein, in response to said priority signal being a high priority signal, said generated switch control signal causes said switch to couple said second interface means to said data memory interface means whether or not said first access control signal is asserted.

17. In a system including a control processor, a coprocessor, a program memory and a data memory, said control processor accessing said program memory during an instruction fetch cycle and said data memory during an instruction execution cycle, wherein said instruction fetch and instruction execution cycles are mutually exclusive, an apparatus for controlling access to said data memory, said apparatus comprising:

control processor interface means for coupling to said control processor;

coprocessor interface means for coupling to said coprocessor;

channel control means, coupled to said coprocessor interface means, and including first in first out (FIFO) memory means, said channel control means storing in said FIFO memory means data associated with a coprocessor request for access to said data memory and asserting a FIFO full signal in response to said FIFO memory means being full;

detection means, coupled to said control processor interface means, for detecting when said control processor requests access to said program memory and generating a first access control signal in response thereto;

scheduling means, coupled to said channel control means, for generating a priority signal in response to said FIFO full signal being asserted;

a switch having a switch control input means, a first interface means for coupling to memory address, memory data and memory control signals associated with said control processor, a second interface means for coupling to memory address, memory data and memory control signals associated with said coprocessor, and a data memory interface means for coupling to said data memory, wherein said switch alternatively couples said first interface means or said second interface means to said data memory interface means in response to a switch control signal received from said control input; and arbitration means, coupled to said detection means, said scheduling means, and said switch, for generating a switch control signal only in response to said first access control signal and said priority signal, wherein said priority signal designates one of a plurality of priority levels, said priority levels including a high priority level, and wherein said scheduling means generates a priority signal designating said high priority level in response to said FIFO full signal being asserted, and wherein said arbitration means, in response to said priority signal being a high priority signal, generates a coprocessor select switch control signal that causes said switch to couple said second interface means to said data memory interface means whether or not said first access control signal is asserted, and then continues to generate said coprocessor select switch control signal until a signal indicative of said FIFO memory means being empty is detected.

18. In a system including a control processor, a first coprocessor, a second coprocessor, a program memory and a data memory, said control processor accessing said program memory during an instruction fetch cycle and said data memory during an instruction execution cycle, an apparatus for controlling access to said data memory, said apparatus comprising:

control processor interface means for coupling to said control processor;

first coprocessor interface means for coupling to said first coprocessor;

second coprocessor interface means for coupling to said second coprocessor;

first and second channel control means, coupled respectively to said first and second coprocessor interface means, and each including first in first out (FIFO) memory means, each of said first and second channel control means storing in said FIFO memory means data associated with a request from a corresponding coprocessor for access to said data memory and asserting a FIFO full signal in response to said FIFO memory means being full;

detection means, coupled to said control processor interface means, for detecting when said control processor requests access to said program memory and generating a first access control signal in response thereto;

multiplexor means having first and second inputs coupled to memory address, memory data and memory control signals associated with said respective first and second coprocessors;

scheduling means, coupled to said first and second channel control means and to said multiplexor, for generating a priority signal in response to said FIFO full signal being asserted by at least one of said first and second channel control means, and for generating a multiplexor control signal;

a switch having a switch control input means, a first interface means for coupling to memory address, memory data and memory control signals associated with said control processor, a second interface means for coupling to memory address, memory data and memory control signals associated with an output of said multiplexor, and a data memory interface means for coupling to said data memory, wherein said switch alternatively couples said first interface means or said second interface means to said data memory interface means in response to a switch control signal received from said control input; and arbitration means, coupled to said detection means, said scheduling means, and said switch, for generating a switch control signal only in response to said first access control signal and said priority signal, wherein said instruction fetch and instruction execution cycles are mutually exclusive.

19. The apparatus of claim 18, wherein said scheduling means generates a priority signal having a first value in response to said FIFO full signal being asserted by said first channel control means, a priority signal having a second value in response to said FIFO full signal being asserted by said second channel control means, and said priority signal having said first value in response to said FIFO full signals being asserted by both said first and second channel control means.

20. The apparatus of claim 19, wherein said scheduling means generates a multiplexor control signal that selects said first multiplexor input in response to said FIFO full signals being asserted by both said first and second channel control means.

21. The apparatus of claim 20, wherein said priority signal designates one of a plurality of priority levels, said priority levels including a high priority level, and wherein said scheduling means generates a priority signal designating said high priority level in response to any of said FIFO full signals being asserted.

22. The apparatus of claim 21, wherein, in response to said priority signal being a high priority signal, said generated switch control signal causes said switch to couple said second interface means to said data memory interface means whether or not said first access control signal is asserted.

23. The apparatus of claim 19, wherein, in response to said priority signal being said second value, said generated switch control signal causes said switch to interleave data memory accesses between said control processor and said multiplexor.

24. In a system including a control processor, a first coprocessor, a second coprocessor, a program memory and a data memory, said control processor accessing said program memory during an instruction fetch cycle and said data memory during an instruction execution cycle, wherein said instruction fetch and instruction execution cycles are mutually exclusive, an apparatus for controlling access to said data memory, said apparatus comprising:

control processor interface means for coupling to said control processor;

first coprocessor interface means for coupling to said first coprocessor;

second coprocessor interface means for coupling to said second coprocessor;

first and second channel control means, coupled respectively to said first and second coprocessor interface means, and each including first in first out (FIFO) memory means, each of said first and second channel control means storing in said FIFO memory means data associated with a request from a corresponding coprocessor for access to said data memory and asserting a FIFO full signal in response to said FIFO memory means being full;

detection means, coupled to said control processor interface means, for detecting when said control processor request access to said program memory and generating a first access control signal in response thereto;

multiplexor means having first and second inputs coupled to memory address, memory data and memory control signals associated with said respective first and second coprocessors;

scheduling means, coupled to said first and second channel control means and to said multiplexor, for generating a priority signal in response to said FIFO full signal being asserted by at least one of said first and second channel control means, and for generating a multiplexor control signal;

a switch having a switch control input means, a first interface means for coupling to memory address, memory data and memory control signals associated with said control processor, a second interface means for coupling to memory address, memory data and memory control signals associated with an output of said multiplexor, and a data memory interface means for coupling to said data memory, wherein said switch alternatively couples said first interface means or said second interface means to said data memory interface means in response to a switch control signal received from said control input;

arbitration means, coupled to said detection means, said scheduling means, and said switch, for generating a switch control signal only in response to said first access control signal and said priority signal; and direct memory access (DMA) counter means including:
a random access memory having storage locations in correspondence with said first and second coprocessors;

first means, coupled to said first and second channel control means, for determining which of said first and second coprocessors has a highest priority request for a data memory access and for generating a bus request signal;

second means, coupled to said first means and to said control processor interface means, for generating a bus grant signal in response to said bus request signal and instruction fetch and address signals from said control processor;

third means, coupled to said first means, said second means and to said random access memory, for reading a value from said random access memory in response to said bus grant signal, said value being read from a storage location corresponding to said coprocessor that was determined as having said highest priority request; and fourth means for providing said value as at least part of said memory address signals that are used for addressing said data memory, and for thereafter modifying said value and storing said modified value in said random access memory at said storage location corresponding to said coprocessor that was determined as having said highest priority request.

25. In a system comprising a control processor, a plurality of coprocessors and a data memory, a direct memory access (DMA) counter means comprising:

control processor interface means for coupling to said control processor;

a plurality of coprocessor input means for coupling to corresponding ones of said plurality of coprocessors;

a random access memory having storage locations in correspondence with said plurality of coprocessors;

first means, coupled to said plurality of input means, for determining which of said plurality of coprocessors has a highest priority request for a data memory access and for generating a bus request signal;

second means, coupled to said first means and to said control processor interface means, for generating a bus grant signal only in response to said bus request signal and instruction fetch and address signals from said control processor;

third means, coupled to said first means, said second means and to said random access memory, for reading a value from said random access memory in response to said bus grant signal, said value being read from a storage location corresponding to said coprocessor that was determined as having said highest priority request; and fourth means for providing said value as at least part of said memory address signals that are provided to said data memory during a memory access, and for thereafter modifying said value and storing said modified value in said random access memory at said storage location corresponding to said coprocessor that was determined as having said highest priority request.

* * * * *